Figure 1:
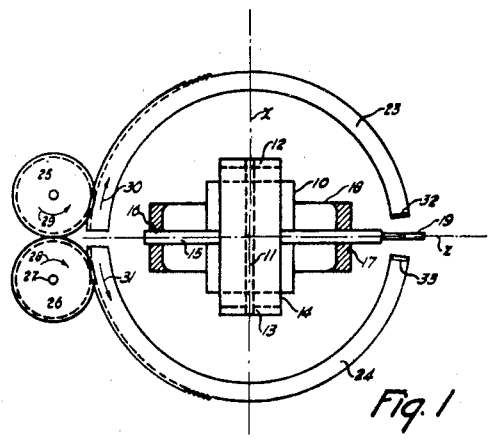

Aug. 22, 1950     CARL-ERIK GRANQVIST     2,519,454
DEVICE FOR CAGING THE GIMBAL
MOUNTING IN GYROSCOPES
Filed Jan. 22, 1946

INVENTOR.
Carl-Erik Granqvist
BY
his ATTORNEY

Patented Aug. 22, 1950

2,519,454

UNITED STATES PATENT OFFICE 2,519,454

DEVICE FOR CAGING THE GIMBAL MOUNTING IN GYROSCOPES

Carl-Erik Granqvist, Lidingo, Sweden, assignor to Svenska Aktiebolaget Gasaccumulator, Lidingo, Sweden, a corporation of Sweden Application January 22, 1946, Serial No. 642,700
In Sweden January 25, 1945

5 Claims. (Cl. 74—5.1)

My invention relates to a device for caging the gimbal mounting in gyroscopes.

Caging devices are used in gyroscopes partly for rapidly adjusting them to a normal position when they for some reason deviate from their normal position, and partly, too, for locking the gyroscope in normal position in order to protect it against such strong stresses as may arise in connection with very swift manoeuvring movements of the vessel on which the gyroscope is mounted, for instance acceleration and retardation stresses upon the landing of aircraft and so on.

As a rule the caging device consists partly of a key member, usually of a plane shape and carried by one of the gimbal frame shafts, and partly of two stops which by some mechanical moving device may be brought to approach each other so that the key is clamped between the stops.

It may occur that for some reason the gyroscope has occupied a position which differs from its normal position inasmuch as the plane key is not right between the two stops and has its plane in another manner than parallel to the stop faces. When the two stops while moving uniformly are approaching each other and the key, one of the stops will consequently first strike one edge on the key through which two different effects arise. First the shaft on which the key is mounted will be subjected to a turning movement about its own geometric axis and secondly this shaft will also be displaced to a different geometric position.

It is now known, however, that in gyroscopes two such motions react upon each other so that one motion causes a forced motion in the direction of the other motion and the consequence of this may be that if the key is given a rotary motion about itself, this results in a swift and strong motion in such a direction that the longitudinal direction of the key shaft will also become changed. In this way the key may happen to leave the stop against which it has struck and approach the other stop with a powerful shock effect. Here arises a new impulse by which the phases of motion of the key are changed in another direction than before and the key approaches again the first stop with a powerful shock. In this manner while intermittently striking against the two stops the key will gradually approach its normal position as the stops approach each other. These stroke motions are, however, very injurious to the gyroscope. In the first place the mechanical elements of the gyroscope in this way may be subjected to stresses which they are not able to sustain, and more particularly it may occur that fatigue stresses arise in that manner. In the second place the bearings are very strongly worn, and experience has also shown that the bearings are the parts of the gyroscope which earlier than any other parts cause that the gyroscope no longer rotates evenly and must be subjected to a revision.

The present invention refers to an attachment to the caging device for gyroscopes by means of which these intermittent motions are either completely eliminated or at least reduced to such a small effect that the shocks no longer can be considered substantially injurious to the gyroscope.

Figure 2:
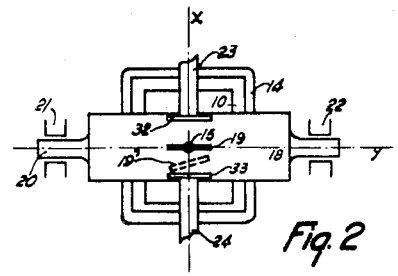
Figure 4:
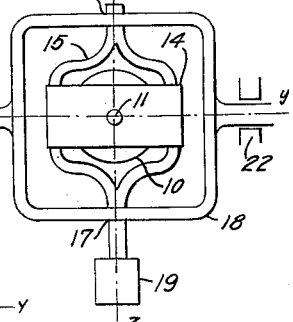
Figure 3:
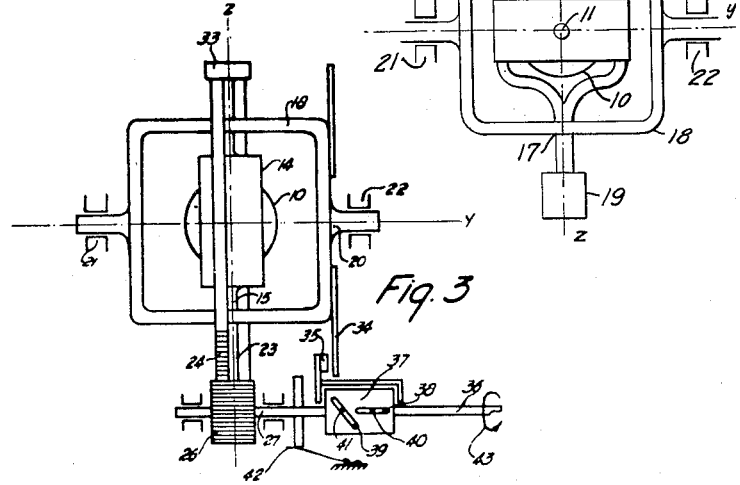

The invention is more closely described below with reference to the accompanying drawing in which Figs. 1 and 2 show a known arrangement of the caging apparatus in a gyroscope, while Fig. 3 shows the same arrangement as modified according to the invention. Fig. 4 is a view similar to Fig. 2 but illustrating the inner and outer gimbal frames rotated 90° about their axes to disclose the mounting of the inner frame in greater detail.

In Fig. 1 the rotor of the gyroscope is denoted by 10. The rotor rotates about the spindle 11 supported in bearings in the inner gimbal frame 14. The spindle 11 normally coincides with the geometric X-axis. The inner gimbal frame has two bearings 12 and 13 for the spindle 11 and is itself carried by the shaft 15. This shaft in its turn is supported in bearings at the two points 16 and 17 in the outer gimbal frame 18. Furthermore, the shaft 15 is extended and carries the key member 19. In its normal position the shaft 15 coincides with the geometric Z-axis.

The outer gimbal frame 18, finally, is carried by the shaft 20 turnable in the bearings 21 and 22. In its normal position the shaft 20, should coincide with the geometric Y-axis.

In the embodiment shown in Fig. 1 and Fig. 2 the means used for the caging operation comprises two toothed hoop portions 23 and 24 arranged to move in two parallel planes about a common axis. The toothed hoop portions mesh with two pinions 25 and 26 so disposed that when the caging shaft 27 is turned they rotate in opposite directions. In small gyroscopes the caging shaft 27 is usually operated manually, while in large gyroscopes a separate motor, the so called caging motor, operates the caging shaft 27. As the shaft 27 is turned in the direction of the arrow 28, the pinion 25 will be rotated in the direction of the arrow 29 and the semi-circular toothed hoop portions 23 and 24 will be turned in the directions of the arrows 30 and 31, respectively. At the free ends of the toothed hoop portions the stop members 32 and 33 are disposed in such a manner that they engage the key 19. By turning the toothed hoop portions 23 and 24 as far as possible in the directions of the arrows 30 and 31 the stop members 32 and 33 will consequently clamp the key 19 between them so that it occupies the normal position shown in Fig. 2.

It may happen that due to erroneous starting or due to the action of exterior casual forces the gyroscope has been displaced out of its normal position so that the key 19 occupies for instance the position 19' such as that indicated in dotted lines in Fig. 2. As the stop members 32 and 33 while moving uniformly approach each other, the stop member 33 will first engage the left edge of the key 19 when it is in the position 19'. The consequence of this is that two different motive impulses are produced, viz. first there will be produced an impulse tending to turn the key 19 about the shaft 15 so that the key occupies a position parallel to the stop members 32 and 33 and secondly there will also be produced an impulse tending to move the key 19 from the erroneous position 19' to the central position between the stop members 32 and 33 where the key 19 is shown in Fig. 2. Due to the physical properties of the gyroscope, however, these two motions interact in such a manner that one motion gives rise to a forced motion of the other kind and in certain instances it may occur that the key 19 is thrown towards the stop member 32 with a greater velocity than that which follows from the motion of the stop member 33 and the key 19 will strike the stop member 32 with a powerful shock. This shock imparts a new impulse to the key 19 which throws the key back towards the stop member 33 and from there the key will be thrown back again towards the stop member 32. It is the shocks arising from said impacts on the stop members 32 and 33 which will damage the bearings and to a certain degree also the other mechanical parts of the supporting means of the gyroscope, and it is these impacts that are to be avoided according to the invention.

According to the invention there is effected a braking of the motion of that gimbal frame for instance whose shaft is perpendicular to the planes of motion of the stop members 32 and 33. In this way the impact energy is reduced, and in many cases the impact energy can even be reduced so far that the shock between the key 19 and the stop members 32 and 33 respectively, is not produced.

According to the embodiment of the invention shown in the drawing a brake disc 34 cooperating with a brake shoe 35 is fixedly secured to the outer gimbal frame 18 for this purpose. The brake shoe 35 is controlled from the shaft 36 of the caging motor in such a manner that first the braking sets in and then the caging takes place. When the shaft 36 of the caging motor is turned in the opposite direction the braking is first broken off and then the caging. To this end the following arrangement is made:

The caging shaft 27 is disposed in the extension of the shaft 36 of the caging motor and connected with the same by means of a sleeve coupling 37. The sleeve coupling has two slots, which are not parallel. Preferably one of the slots can be parallel to the shaft while the other slot forms an oblique angle with the shaft. In the figure the slot disposed in parallel to the shaft is denoted 38 and the obliquely disposed slot 39. A pin 40 fixed to the shaft 36 engages the slot 38, and a pin 41 correspondingly fixed to the shaft 27 engages the slot 39. For the shaft 27 there is further provided a friction means by which its rotation is prevented until the pin 41 has been displaced from one end position to the other end position by the slot 39. The friction means is schematically indicated by 42.

As the caging shaft rotates in the direction of the arrow 43 the pin 40 on account of its cooperation with the slot 38 will drive the sleeve 37. The pin 41, however, which is secured to the shaft 27, is then kept still by means of the friction means 42 which ever so long effectively prevents the rotation of the shaft 27. The consequence of this is that the sleeve coupling 37 will be displaced to the right in the figure so that the brake shoe 35 engages the brake disc 34. After the sleeve in this way has been turned so far that the end of the slot 39 turned upwardly to the left has engaged the pin 41 continued rotation is transmitted to the shaft 27 and the caging begins. The caging thus takes place during an interval during which the outer gimbal frame is subjected to a strong braking action which clamps every tendency to oscillation of this frame. After the caging has been completed and the key 19 accordingly has occupied its normal position, the direction of motion of the caging motor is reversed, but on account of the braking by the means 42 the shaft 27 does not immediately take part in that motion. The sleeve 37 will therefor be displaced to the left through the intermediary of the pin 41 and the slot 39 so that the braking between the shoe 35 and the disc 34 is suspended. Only when the sleeve has been moved so far to the left as is permitted by the slot 39 in cooperation with the pin 41 will the shaft 27 participate in the continued rotation of the shaft 36 and the caging will be released. The gyroscope will then remain in its normal position.

It is evident that the device described above is an illustration only of an embodiment of the invention and that several details in it can be of a different nature than has been indicated in the embodiment. For instance it is not necessary that the caging means is operated by two semicircular, peripherally directed racks, but to this end every other practical means can be used instead.

What is claimed is:

1. In a gyroscope, a rotatable mass, a base, gimbal frames rotatably supported by said base for freely mounting said mass with respect to said base, shafts for rotatably connecting said frames to each other, a projection extending from one of said shafts in axial alignment with the shaft connecting said one frame to another frame, a pair of caging members movably disposed on either side of said projection, means for moving said caging members into contact with said projection to clamp the latter between the caging member to thereby turn said one gimbal frame into predetermined position relative to said base, and a brake responsive to operation of said means to resist turning of said one gimbal frame.

2. In a gyroscope, a rotatable mass, a base, gimbal means rotatably supported by said base for freely mounting said mass with respect to said base, caging means operative to turn said gimbal means to a predetermined position relative to said base, a first shaft rotatable to operate said caging means, a second rotatable shaft, a lost-motion connection between said shafts, braking means for resisting turning of the gimbal means, and means responsive to initial rotation of said second shaft for applying said braking means prior to rotation of said first shaft.

3. In a gyroscope, a rotatable mass, a base, gimbal means rotatably supported by said base for freely mounting said mass with respect to said base, caging means operative to turn said gimbal means to a predetermined position relative to said base, a first shaft rotatable to operate said caging means, a second rotatable shaft, a lost-motion coupling between said shafts axially displaceable in response to the application thereto of torque by said second shaft, a brake disc carried by said gimbal means, and a brake shoe movable into frictional engagement with said disc in response to the axial displacement of said coupling.

4. In a gyroscope, a rotatable mass, a base, gimbal means including frames rotatably supported for freely mounting said mass with respect to said base and having a key projecting from one of said frames, a pair of caging members movably disposed on either side of said key, means for moving said caging members into contact with said key to clamp the latter between the caging members to thereby turn said one gimbal frame into predetermined position relative to said base and to turn said key into a predetermined plane relative to said base, and a brake responsive to operation of said means to resist turning of said one gimbal frame.

5. In a gyroscope, a rotatable mass, a base, gimbal means rotatably supported by said base for freely mounting said mass with respect to said base, caging means operative to turn said gimbal means to a predetermined position relative to said base, a first shaft rotatable to operate said caging means, a second rotatable shaft, a coupling between said shafts, a lost-motion connection between said coupling and said second shaft, braking means for resisting turning of the gimbal means, and means forming part of said coupling responsive to initial rotation of said second shaft for applying said braking means prior to rotation of said first shaft.

CARL-ERIK GRANQVIST.

REFERENCES CITED

The following references are of record in the file of this patent:

UNITED STATES PATENTS

| Number | Name | Date |
|---|---|---|
| 1,522,924 | Sperry | Jan. 13, 1925 |

FOREIGN PATENTS

| Number | Country | Date |
|---|---|---|
| 495,431 | Great Britain | Nov. 14, 1938 |